United States Patent
Viadyanathan et al.

(10) Patent No.: US 8,446,996 B1
(45) Date of Patent: May 21, 2013

(54) SAMPLING RESOLUTION AND GAIN CONTROLLER FOR A WIRELESS RECEIVER

(75) Inventors: Karthik Viadyanathan, Bangalore (IN); Partha Sarathy Murali, San Jose, CA (US)

(73) Assignee: Redpine Signals, Inc., San Jose, CA (US)

( * ) Notice: Subject to any disclaimer, the term of this patent is extended or adjusted under 35 U.S.C. 154(b) by 0 days.

(21) Appl. No.: 13/286,953

(22) Filed: Nov. 1, 2011

Related U.S. Application Data

(63) Continuation of application No. 11/825,832, filed on Jul. 7, 2007, now Pat. No. 8,073,085.

(51) Int. Cl.
*H04L 27/08* (2006.01)

(52) U.S. Cl.
USPC ........... 375/345; 375/260; 375/267; 375/316; 375/322; 375/346

(58) Field of Classification Search
USPC ................. 375/130, 135, 259, 260, 262, 267, 375/290, 299, 306, 316, 322, 340, 342, 345, 375/346, 347, 350, 359
See application file for complete search history.

(56) References Cited

U.S. PATENT DOCUMENTS

| | | | |
|---|---|---|---|
| 7,602,860 B2 * | 10/2009 | Hietala et al. | 375/317 |
| 7,656,970 B1 * | 2/2010 | Sankabathula et al. | 375/316 |
| 7,746,966 B2 * | 6/2010 | Lee et al. | 375/345 |
| 7,961,126 B2 * | 6/2011 | Deval et al. | 341/131 |
| 7,965,982 B2 * | 6/2011 | Palin et al. | 455/41.2 |
| 2004/0252776 A1 * | 12/2004 | Balakrishnan et al. | 375/260 |
| 2007/0223626 A1 * | 9/2007 | Waxman | 375/316 |
| 2010/0128817 A1 * | 5/2010 | Philips et al. | 375/316 |
| 2012/0032855 A1 * | 2/2012 | Reede et al. | 342/458 |

* cited by examiner

*Primary Examiner* — Hirdepal Singh
(74) *Attorney, Agent, or Firm* — File-EE-Patents.com; Jay A. Chesavage

(57) ABSTRACT

A gain controller for a wireless communication system sets the receiver gain during the initial time duration of a preamble, and for each subsequent symbol computes a new gain value, which is applied at the end of each symbol. An analog to digital converter resolution controller sets the resolution of the ADC to a high resolution during a preamble interval and a first symbol interval, and to a comparatively lower resolution thereafter until the end of the frame. When a new zone is entered, the first symbol of the new zone is sampled at a higher resolution than the subsequent symbols.

14 Claims, 4 Drawing Sheets

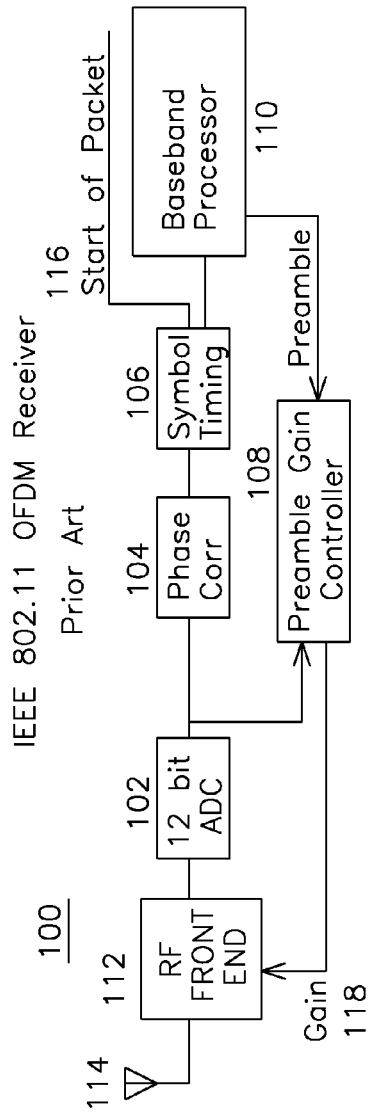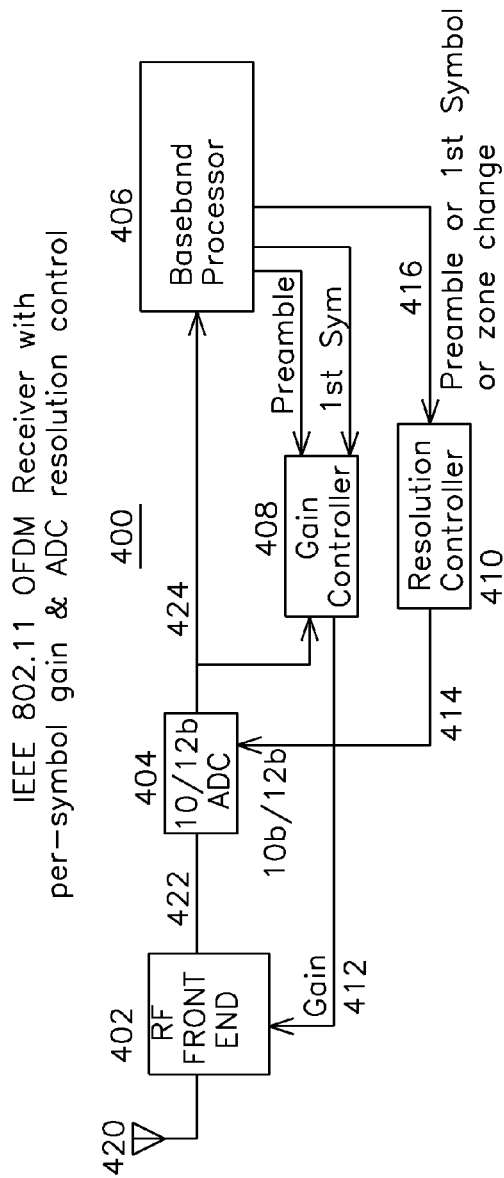

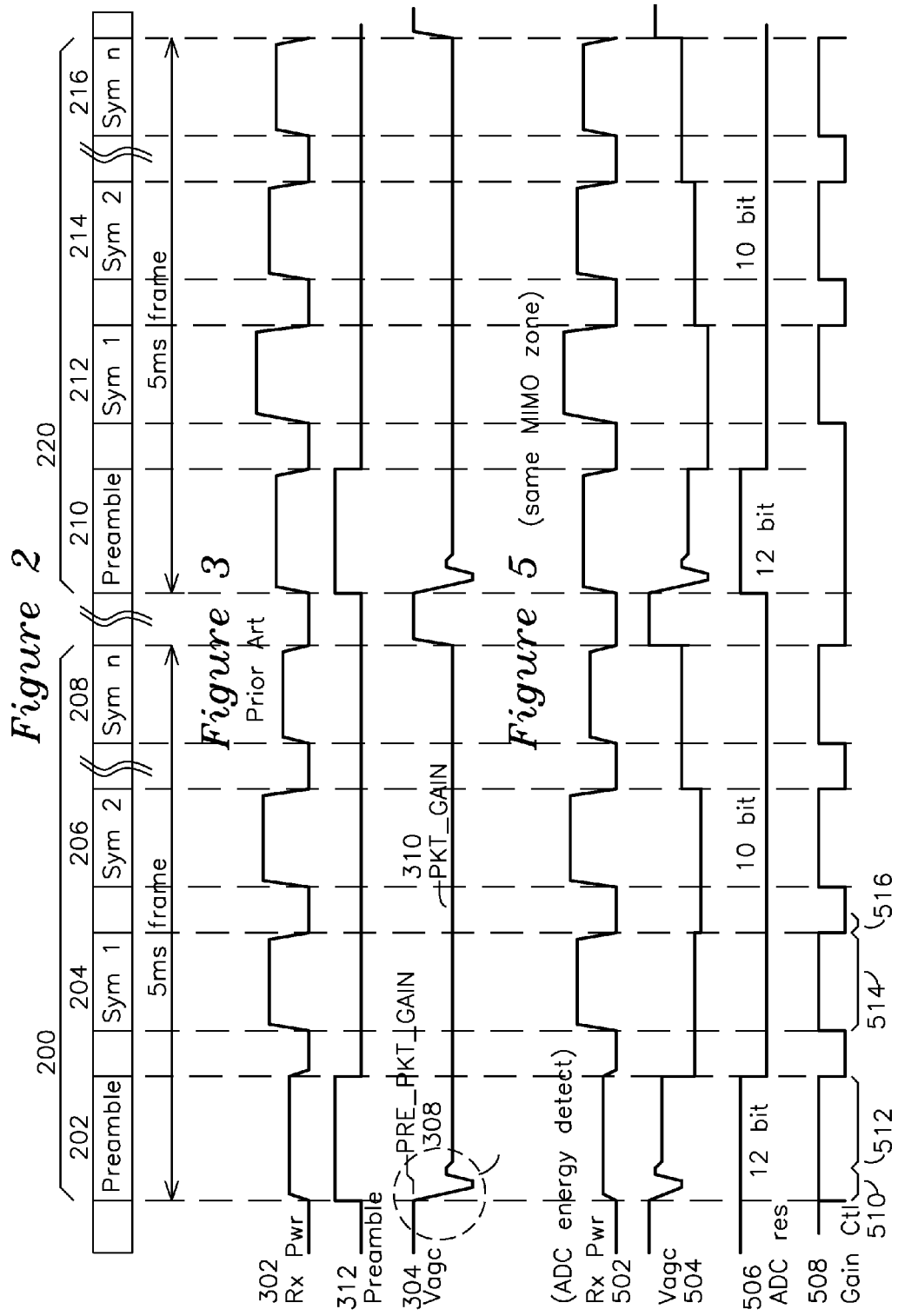

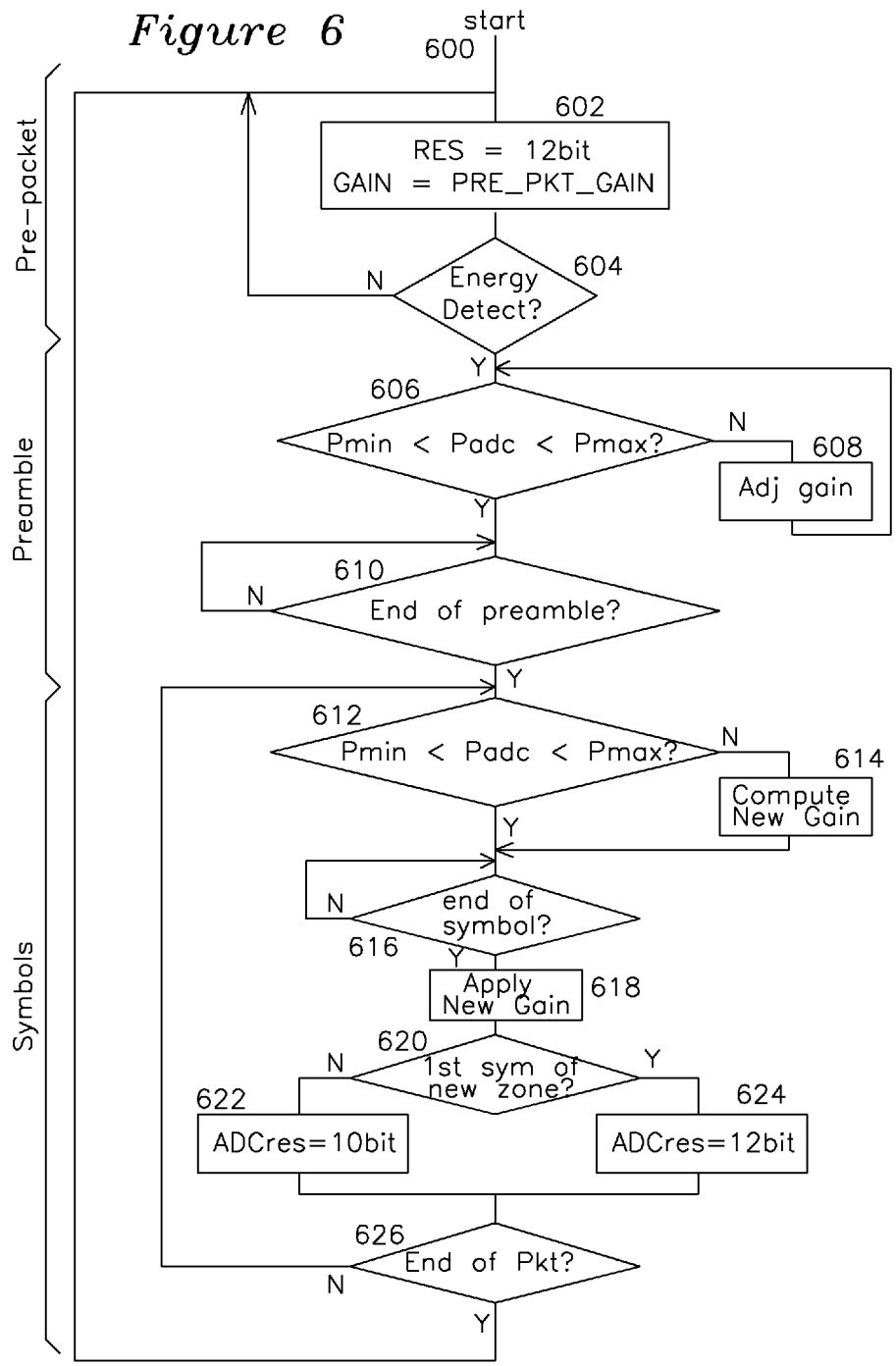

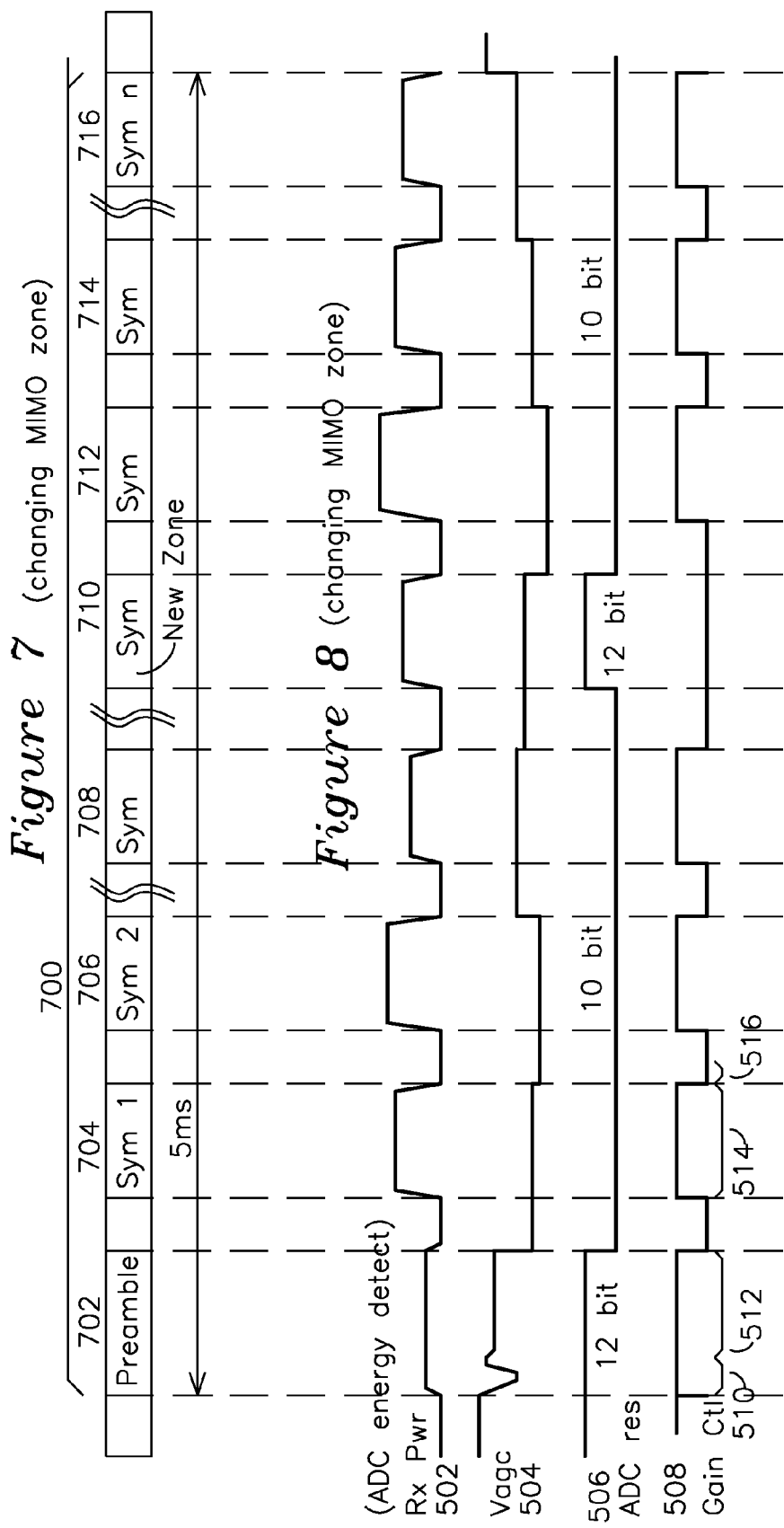

SAMPLING RESOLUTION AND GAIN CONTROLLER FOR A WIRELESS RECEIVER

The present application is a continuation of patent application Ser. No. 11/825,832 filed Jul. 7, 2007, now issued as U.S. Pat. No. 8,073,085.

FIELD OF THE INVENTION

Background of the Invention

FIG. 1 shows a prior art OFDM receiver 100 for wireless signal processing, where wireless signals are received at antenna 114, are amplified and converted to a baseband quadrature signal by RF front end 112, the output of which is sampled by Analog to Digital Controller (ADC) 102, which has a fixed sampling resolution such as 12 bits, which is sufficient for the dynamic range of signals in a packet. The output of the ADC 102 is furnished to phase correction 104, which removes phase rotations associated with frequency differences between the transmitted signal and the received signal, and this output is provided to a symbol timing function 106, which determines the start of packet 116 and symbol location, and provides this to the baseband processor 110 which demodulates the signals and handles any re-transmission requests for lost packets, thereby generating a data stream as was originally transmitted. The RF front end 112 includes a gain control 118 which is set during the preamble interval for single channel systems, or during the first symbol of a new zone in each frame for MIMO (multiple input multiple output) systems by the gain controller 108, as will be described later. The RF front end gain control 118 is critical because the wireless environment includes large variations in receive signal strength. These signal strength variations can be caused by temporally varying 'multipath' reflections due to receiver or inter-path reflector movements that add or subtract generating variations in signal strength or can be caused by switching from a 1×1 antenna configuration zone (subframe) to a MIMO N×N antenna configuration zone (subframe) inside a frame which introduces new signal sources and end points and therefore new sets of 'multipath' reflections. Additionally, in the IEEE 802.16e standard, a transmitter may have a variety of subchannel configurations, referred to as 'zones', which result in the use of a particular subset of available subcarriers to carry information. Two types of zones are FUSC (Fully Used Sub-Carrier) or PUSC (Partially Used Sub-Carrier, where the particular subcarriers in use may vary. When the receiver moves into or out of a zone operating with a different set of subcarriers, the additional power which is transmitted after joining the zone may result in an abruptly higher or lower power level. When the receiver is operating in an environment where the zones are changing and causing different subcarrier combinations to be present, combined with the more slowly varying multipath reflections, there can be a significant variation in the received signal power as these subcarriers undergo different multipath reflections, and subcarrier power levels, as shown in FIGS. 2 and 3. In the prior art of 802.11a and 802.11g, a fixed gain level could be used for an entire wireless packet based on a preamble signal level, whereas in MIMO systems described in 802.16e, a different approach may be required.

FIG. 2 shows a prior art wireless packet such as an OFDM packet of 802.11a or 802.11g, or 802.11ae. Each packet 200 includes a preamble 202 which identifies the packet type and data rate, followed by a succession of symbols 204 . . . 208, and is followed by a similarly formed subsequent packet 220 shown starting with preamble 210.

FIG. 3 shows waveforms for the receiver of FIG. 1 aligned with the time sequence of the preamble and the symbols of the FIG. 2 packet. Waveform 302 shows the incoming signal level before gain adjustment, and waveform 304 shows the gain control voltage (Vagc) used to change the gain of the RF amplifiers of the RF front end 112 of FIG. 1. In the prior art receiver 100 of FIG. 1, the receiver gain 118 is set to a relatively high gain level shown in FIG. 3 waveform 304 as PRE_PKT_GAIN prior to the arrival of a packet, and then the gain is reduced or increased by the gain controller 108 as determined by examining the energy level of the digitized signals at the output of the ADC 102. The gain controller 108 examines the energy level during the preamble as determined by baseband processor 110 to set the RF front end gain 118, as seen in gain waveform 304, which converges in region 308 to a packet gain PKT_GAIN 310 by examining the ADC digitized range of values, and reducing the gain when the maximum values result in saturation of the ADC, and increasing the gain when the maximum values are less than a threshold of 6 db below saturation, or any other threshold below saturation which provides linear operation of the ADC. Once the gain control voltage 304 (signal 118 of FIG. 1) is set during the packet preamble 202, this gain remains in effect for the duration of the packet until the end of the current packet, whereupon it returns to PRE_PKT_GAIN until the arrival of the next preamble.

PRIOR ART

U.S. Patent Application 2003/0194029 describes a gain control system for an OFDM SISO (Single Input Single Output) such as a cellular phone TDMA system where the AGC function changes gain between frames.

U.S. Patent Application 2005/0169397 describes a receiver gain control system for a MIMO (Multiple Input Multiple Output) system which uses H matrix values to form AGC levels.

OBJECTS OF THE INVENTION

A first object of the invention is a resolution controller for an analog to digital converter (ADC), whereby the controller causes the ADC to have a high resolution such as 12 bits during a preamble interval and the first symbol of a new zone, and a lower resolution such as 10 bits for the remainder of the frame.

A second object of the invention is a gain controller for a wireless receiver, whereby the gain controller causes the gain of the receiver to be adjusted for each new received symbol by measurement of the ADC output energy level of the previous symbol.

A third object of the invention is a resolution controller for an analog to digital converter (ADC) combined with a gain controller for a wireless receiver, whereby the resolution controller causes the ADC to have a high resolution during a preamble interval and the first symbol of a new zone, and a lower resolution for the remainder of the packet, and the gain controller causes the gain of the receiver to be adjusted for each new received symbol by measurement of the ADC output energy level of the previous symbol.

SUMMARY OF THE INVENTION

In a first embodiment of the invention, an analog to digital converter (ADC) resolution controller is operated in a high resolution during a preamble interval and the first symbol of a new zone, and in a lower resolution thereafter until the end of the packet. Changing the ADC resolution from a high resolution such as 12 bits to a lower resolution such as 10 bits results in reduced power consumption.

In a second embodiment of the invention, an analog front end gain controller performs gain control by performing a coarse gain control from an initial pre-packet gain (PRE_P-KT_GAIN) to a preamble gain (PREAMBLE_GAIN), as in the prior art, and thereafter performs symbol to symbol gain adjustments by measuring the average and/or peak power during a current symbol and applying a change in gain during the intersymbol gap time, such that the new gain level is constant during the following symbol. This symbol to symbol gain adjustment allows the ADC to operate in an optimal linear quantization region, whereby the sampling dynamic range of the ADC is most effectively used.

In a third embodiment of the invention, an analog front end gain controller performs gain control by performing a coarse gain control from an initial pre-packet gain (PRE_PKT_GAIN) to a preamble gain (PREAMBLE_GAIN), as in the prior art, and thereafter performs symbol to symbol gain adjustments by measuring the average and/or peak power during a current symbol and applying a change in gain during the intersymbol gap time, such that the new gain level is constant during the following symbol. Concurrently, an analog to digital converter (ADC) resolution controller is operated in a high resolution mode during a preamble interval and the first symbol of a new zone, and in a comparatively lower resolution mode in other parts of a frame. Changing the ADC resolution from 12 bits to 10 bits results in reduced power consumption, and adjustments in receiver gain from symbol to symbol enable the reduction in ADC resolution while minimizing or eliminating the effect of reduced resolution on the receiver error rate.

BRIEF DESCRIPTION OF THE DRAWINGS

FIG. 1 shows the block diagram for a prior art OFDM receiver.

FIG. 2 shows wireless packets with inter-symbol gaps and interpacket gaps.

FIG. 3 shows the waveform for a prior art OFDM receiver.

FIG. 4 shows the block diagram for the MIMO receiver of the present invention.

FIG. 5 shows the waveforms for the MIMO receiver of FIG. 4.

FIG. 6 shows the processing flow for the MIMO receiver of FIG. 4.

FIGS. 7 and 8 show the processing flow for the MIMO receiver of FIG. 4 where a zone change occurs mid-frame.

DETAILED DESCRIPTION OF THE INVENTION

FIG. 4 shows an OFDM receiver 400 which includes an antenna 420 for receiving wireless signals, an RF front end 402 for amplifying these signals and converting them to a quadrature baseband signal 422, and a variable resolution analog to digital converter 404, which supports more than one conversion resolution, shown in FIG. 4 as 10 bit and 12 bit. FIG. 4 is best understood in combination with FIG. 5, which shows the waveforms of operation having timing relationships related to the incoming packet 200 and 220 of FIG. 2, and incoming receive power 502. Typically, the two channels forming the quadrature output 422 are sampled with a dual channel variable resolution ADC 404. The output 424 of ADC 404 is coupled to a baseband processor 406 for demodulation and decoding of data, which may also include the phase correction and symbol timing functions described in FIG. 1.

The baseband processor 406 indicates 416 the duration of the preamble for use by the resolution controller 410, which causes the ADC 404 to operate in a high resolution mode such as 12 bit during this interval, thereafter changing to a lower resolution mode such as 10 bit during the remainder of the packet, as can also be seen in waveform 506 of FIG. 5. The broadband processor 406 also provides signals for use by the gain controller 408, which establish a gain adjustment interval during the preamble, as was done for the prior art gain preamble gain controller 108, and also includes the function of step adjustment of gain for each subsequent symbol during the inter-symbol gaps. FIG. 5 shows the incoming receive power 502 operating in conjunction with gain control waveform 504, corresponding to gain control signal 412 of FIG. 4. The preamble gain control performed during the preamble interval 202 is done at the beginning of the packet, as shown in 510 of waveform 508, and once computed is held steady for the duration 512 of the preamble. Symbol gain adjustments are performed in a different manner. During a symbol such as 204, the signal level is measured as shown in duration 514 of waveform 508, and during the interpacket gap interval from the end of a previous symbol such as 204 to the start of the next symbol such as 206, the results of the amplitude measurement are applied in a single step change during intersymbol interval such as 516. In this manner, the gain of the receiver may be changed without affecting the linearity of the signal processing within a single symbol, since the gain changes are done during the gaps between symbols. It is also important to note that the nature of the modulation during the preamble is different than the nature of the modulation during the remainder of the packet symbols, and since the gain control is set at the beginning of the preamble shown as interval 510, and the next gain change is not performed until the end of the first symbol 516, the interval spanning 512 and 514 are not afforded the receiver gain adjustment that follows the first symbol 204. For this reason, the ADC resolution is maintained at 12 bits during both the preamble 202 and first symbol 204, as the receiver gain adjustments which follow the first symbol through the last symbol allow for a reduced quantization resolution such as 10 bits shown in waveform 506.

FIG. 6 shows the operation of the gain controller 408 and resolution controller 410 of FIG. 4 from the perspective of a process such as that of a state controller. The process starts 600 with the ADC resolution set high such as 12 bits and gain set to a pre packet gain level in step 602, which is maintained until either energy is detected 604 or an incoming packet is detected by the baseband processor in step 604. The initial preamble gain is iteratively set in steps 606 and 608, which correspond to preamble gain adjustment interval 510 of FIG. 5. Once the average gain is within the limits Pmin and Pmax, this gain is maintained through the remainder of the preamble in step 610. When the preamble has ended, for each symbol, the average power level of the output of the ADC is compared to the range of an upper limit Pmax and lower limit Pmin, which may be the same or different than the thresholds used in step 606, and the new gain is computed in step 614, and applied after the end of the current symbol 616 as shown in interval 516. Each subsequent symbol is handled the same way, with a new gain level computed during the current symbol, and applied to the next symbol until the end of the packet 626. As described earlier, the sampling resolution is set to a high resolution such as 12 bits 624 for the preamble, and a lower resolution such as 10 bits for the remainder of the symbols in the packet 622.

FIGS. 7 and 8 show the operation of the gain controller and the ADC resolution controller when the receiver changes zones during the symbol interval 710. As before, the preamble interval 702 causes the gain control 510 to establish a gain level used during the remainder of the preamble 512, and the ADC resolution controller causes the sampling of the preamble 702 and first symbol of the new zone 710 to occur using a higher than nominal resolution such as 12 bit resolution. After the preamble, and until there is a change in zone as detected by the baseband processor, the sampling resolution occurs at a nominal resolution such as 10 bit. When a zone change occurs such as symbol interval 710, this may cause a change in received subcarrier power, and the ADC resolution changes to 12 bit. In this manner, the ADC resolution controller causes the preamble, first symbol, and any symbol associated with a zone change to be sampled at a comparatively higher resolution than the subsequent symbols. As before, the AGC controller causes the power level to be measured during each symbol and an adjustment of receiver gain to be made immediately following the current symbol or preamble, which is applied to the next symbol received. The advantages of the present invention are reduced power consumption through the operation of the ADC at the lower nominal sampling resolution than would otherwise be required, and the improved use of the available AGC sampling resolution through corrections in gain applied to the following symbol through adjustments determined from the previous symbol. The operation of the gain controller 408 of FIG. 4 and resolution controller 410 of FIG. 4 may be practiced together as shown in the waveforms of FIG. 8, or separately.

In another embodiment of the invention, the ADC may operate in a higher resolution over periods where the digitized signal level cannot be adequately sampled using a lower ADC resolution, including those beyond the preamble and first symbol of a new zone.

In another embodiment of the invention, the ADC may operate in a higher resolution for any symbol that cannot be adequately sampled using a lower ADC resolution.

While the best mode of the invention is set forth in the accompanying figures and specification, the invention may be practiced in many different ways. The gain controller and resolution controller shown in FIG. 5 may be practiced together or separately, although it is believed that the best mode is the combination of the two as described earlier. The gain adjustment step 608 and measurement of Padc may be done using an rms measurement over any number of ADC samples, although a comparatively small number of samples will result in an earlier settling time shown as 510 of waveform 504. The gain computation step 614 and measurement Padc in step step 612 may require the rms measurement of Padc over an entire symbol 514, and the new gain may be applied in a single step or multiple steps over the intersymbol gap shown roughly as interval 516.

We claim:

1. A sampling resolution controller for an analog to digital converter in a receiver coupled to an analog signal source, the analog signal source comprising a preamble followed by a plurality of OFDM symbols from a first set of subcarrier frequencies associated with a first zone and a second set of subcarrier frequencies associated with a second zone, said analog to digital converter coupled to a baseband processor, the baseband processor distinguishing said preamble interval and each said OFDM symbol interval, said baseband processor also distinguishing said first set of subcarrier frequencies associated with said first zone from said second set of subcarrier frequencies associated with said second zone in said OFDM symbols by examination of the subcarriers therein;

said sampling resolution controller having a higher than nominal sampling resolution during a symbol which has said second set of subcarriers, and said nominal sampling resolution at other times;

where at least one of said OFDM symbols contains either a subset of said first set of subcarrier frequencies, a subset of said second set of subcarrier frequencies, or a mixture of subsets of said first set of subcarrier frequencies and said second set of subcarrier frequencies, for which a gain control value is determined at the end of the current symbol for use in a subsequently received symbol.

2. The sampling resolution controller of claim 1 where said nominal sampling resolution is less than 12 bits.

3. The sampling resolution controller of claim 1 where said higher than nominal sampling resolution is 12 bits or more.

4. The sampling resolution controller of claim 1 where said nominal sampling resolution is 10 bits.

5. The sampling resolution controller of claim 1 where said higher than nominal sampling resolution is 12 bits.

6. The sampling resolution controller of claim 1 where the resolution difference from said higher than nominal sampling resolution and said nominal sampling resolution is 2 bits.

7. The sampling resolution controller of claim 1 where said baseband processor examines the samples during said preamble interval and generates a gain control value after the end of said preamble interval.

8. The sampling resolution controller of claim 1 where said baseband processor examines the samples during said symbol interval and generates a gain control value after the end of said symbol interval.

9. A gain controller for a receiver having a variable gain amplifier with an input coupled to an analog signal source, the output of the variable gain amplifier coupled to an analog to digital converter, said analog signal source comprising a preamble followed by a plurality of OFDM symbols, said OFDM symbols having subcarriers from a first transmitter in a first zone and also subcarriers from a second transmitter operative in a different zone than said first zone, said analog to digital converter coupled to a baseband processor, the baseband processor distinguishing said preamble interval and said OFDM symbol interval, said baseband processor also distinguishing said subcarriers from said first zone and said subcarriers from said different zone for each said OFDM symbol;

said baseband processor examining said analog to digital samples during said preamble interval to generate a gain control value after the end of said preamble interval and also at the end of each said OFDM symbol;

where said subcarriers from said first transmitter and subcarriers from said second transmitter are distinct; and where at least one of said OFDM symbols contains either a subset of said subcarriers from said first zone, a subset of said subcarriers from said different zone, or a mixture of subsets of said first zone subcarriers and said different zone subcarriers, for which a gain control value is determined at the end of the current symbol for use in a subsequent symbol.

10. The gain controller of claim 9 where the set of said first transmitter subcarriers and the set of said different transmitter subcarriers are disjoint during each said symbol.

11. The gain controller of claim 9 where said analog signal source contains MIMO symbols.

12. The gain controller of claim 9 where said first zone or said different zone is at least one of FUSC (Fully Used Sub-Carrier) or PUSC (Partially Used Sub-Carrier).

13. The gain controller of claim 9 where said gain control value is applied to said variable gain amplifier.

14. The gain controller of claim 9 where said baseband processor forms said gain control value from said preamble interval and at least one said symbol interval.

\* \* \* \* \*